United States Patent
Candela et al.

(10) Patent No.: US 8,250,003 B2
(45) Date of Patent: Aug. 21, 2012

(54) COMPUTATIONALLY EFFICIENT PROBABILISTIC LINEAR REGRESSION

(75) Inventors: Joaquin Quinonero Candela, Cambridge (GB); Edward Lloyd Snelson, Cambridge (GB); Olivier Michael Christian Williams, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 12/209,621

(22) Filed: Sep. 12, 2008

(65) Prior Publication Data

US 2010/0070435 A1    Mar. 18, 2010

(51) Int. Cl.
*G06F 15/18* (2006.01)
(52) U.S. Cl. .......... 706/12
(58) Field of Classification Search .......... 706/12
See application file for complete search history.

(56) References Cited

U.S. PATENT DOCUMENTS

| | | | |
|---|---|---|---|
| 6,879,944 B1 | 4/2005 | Tipping et al. | |
| 7,020,642 B2 | 3/2006 | Ferguson et al. | |
| 7,318,051 B2 | 1/2008 | Weston et al. | |
| 2004/0093315 A1* | 5/2004 | Carney | 706/15 |
| 2005/0011959 A1* | 1/2005 | Grosvenor | 235/470 |
| 2006/0115145 A1 | 6/2006 | Bishop et al. | |
| 2006/0212413 A1* | 9/2006 | Rujan et al. | 706/20 |
| 2007/0010975 A1 | 1/2007 | Fine et al. | |
| 2007/0026406 A1 | 2/2007 | El Ghaoui et al. | |
| 2008/0059395 A1 | 3/2008 | Flinn et al. | |
| 2008/0162394 A1 | 7/2008 | Horvitz et al. | |

OTHER PUBLICATIONS

Amari, et al., "Improving Support Vector Machine Classifiers by Modifying Kernel Functions", retrieved on Jul. 9, 2008 at <<portal.acm.org/citation.cfm?id=329336 >>, Neural Networks, vol. 12, No. 6, 1999, pp. 783-789.

Apte, et al., "A Probabilistic Estimation Framework for Predictive Modeling Analytics", retrieved on Jul. 9, 2008 at <<http://www.research.ibm.com/journal/sj/413/apte.pdf>>, IBM Systems Journal, vol. 41, No. 3, 2002, pp. 438-448.

Csato, et al., "Sparse Online Gaussian Processes", retrieved on Jul. 9, 2008 at <<http://eprints.ecs.soton.ac.uk/9182/1/gp2.pdf>>, Neural Computation, vol. 14, No. 3, 2002, pp. 641-668.

Goldberg, et al., "Regression with Input-dependent Noise: A Gaussian Process Treatment", retrieved on Jul. 9, 2008 at <<http://books.nips.cc/papers/files/nips10/0493.pdf>>, Advances in Neural Information Processing Systems 10, MIT Press, 1998, pp. 493-499.

MacKay, "Bayesian non-linear modeling for the energy prediction competition", retrieved on Jul. 9, 2008 at <<http://www.cs.toronto.edu/~mackay/pred.ps.gz >>, ASHRAE Transactions, vol. 100, No. 2, 1994, pp. 1053-1062.

(Continued)

*Primary Examiner* — Kakali Chaki
*Assistant Examiner* — Vincent Gonzales
(74) *Attorney, Agent, or Firm* — Lee & Hayes, PLLC

(57) ABSTRACT

A computationally efficient method of performing probabilistic linear regression is described. In an embodiment, the method involves adding a white noise term to a weighted linear sum of basis functions and then normalizing the combination. This generates a linear model comprising a set of sparse, normalized basis functions and a modulated noise term. When using the linear model to perform linear regression, the modulated noise term increases the variance associated with output values which are distant from any data points.

19 Claims, 9 Drawing Sheets

OTHER PUBLICATIONS

Meeds, et al., "An Alternative Infinite Mixture of Gaussian Process Experts", retrieved on Jul. 9, 2008 at http://www.cs.toronto.edu/~osindero/PUBLICATIONS/MeedsOsindero_dpme_nips.pdf>>, Advances in Neural Information Processing Systems 18, MIT Press, 2006, pp. 883-890.

Neal, "Bayesian Learning for Neural Networks", retrieved on Jul. 9, 2008 at <<http://books.google.com/books?id=_peZjbrDC8cC&dq=Bayesian+Learning+for+Neural+Networks&printsec=frontcover&source=bn&hl=en&sa=X&oi=book_result&resnum=4&ct=result>>, Springer, vol. 118, Ch. 2, 1996, pp. 15-17.

Paciorek, et al., "Nonstationary Covariance Functions for Gaussian Process Regression", retrieved on Jul. 9, 2008 at <<http://books.nips.cc/papers/files/nips16/NIPS2003_AA35.pdf>>, Advances in Neural Information Processing Systems 16 (NIPS), MIT Press, 2004, pp. 1-8.

Quinonero-Candela, et al., "A Unifying View of Sparse Approximate Gaussian Process Regression", retrieved on Jul. 9, 2008 at <<http://jmlr.csail.mit.edu/papers/volume6/quinonero-candela05a/quinonero-candela05a.pdf>>, Journal of Machine Learning Research, vol. 6, No. 2, 2005, pp. 1939-1960.

Quinonero-Candela, et al., "Sensible Priors for Sparse Bayesian Learning", retrieved on Jul. 9, 2008 at <<research.microsoft.com/research/pubs/view.aspx?tr_id=1364 - 18k >>, Microsoft Research (Technical Report MSR-TR-2007-121), Sep. 2007, pp. 1-13.

Rasmussen, "Gaussian Processes in Machine Learning", retrieved on Jul. 9, 2008 at <<mitpress.mit.edu/026218253X>>, MIT Press, 2005, pp. 67-75.

Rasmussen, et al., "Healing the Relevance Vector Machine through Augmentation", retrieved on Jul. 9, 2008 at <<http://research.microsoft.com/~joaquinc/papers/rasmussen05healing.pdf>>, ACM ICML Proceedings, vol. 119, 2005, pp. 689-696.

Rasmussen, et al., "Infinite Mixtures of Gaussian Process Experts", retrieved on Jul. 9, 2008 at <<http://books.nips.cc/papers/files/nips14/AA06.pdf>>, Advances in Neural Information Processing Systems Conference (NIPS), MIT Press, 2002, pp. 1-8.

Seeger, et al., "Bayesian Inference and Optimal Design in the Sparse Linear Model", retrieved on Jul. 9, 2008 at <<http://jmlr.csail.mit.edu/proceedings/papers/v2/seeger07a/seeger07a.pdf>>, Proceedings of the 11th International Conference on Artificial Intelligence and Statistics (AISTATS), 2007, pp. 444-451.

Seeger, "Bayesian Modelling for Data Analysis and Learning from Data", retrieved on Jul. 9, 2008 at <<http://www.kyb.tuebingen.mpg.de/bs/people/seeger/papers/handout.pdf>>, 2006, pp. 1-19.

Seeger, "Gaussian Processes for Machine Learning", retrieved on Jul. 9, 2008 at <<http://www.kyb.tuebingen.mpg.de/bs/people/seeger/papers/bayesgp-tut.pdf>>, International Journal of Neural Systems, vol. 14, No. 2, 2004, pp. 69-106.

Silverman, "Some Aspects of the Spline Smoothing Approach to Non-parametric Regression Curve Fitting", retrieved on Jul. 9, 2008 at <<http://www.jstor.org/pss/2348254>>, Journal of the Royal Statistical Society, Series B, vol. 47, No. 1, 1985, pp. 1-20.

Snelson, et al., "Sparse Gaussian Processes Using Pseudo-Inputs", retrieved on Jul. 9, 2008 at <<http://www.gatshy.ucl.ac.uk/~snelson/SPGP_up.pdf>>, MIT Press, Advances in Neural Information Processing Systems (NIPS 18), 2006, pp. 1-8.

Tipping, et al., "Fast Marginal Likelihood Maximisation for Sparse Bayesian Models", retrieved on Jul. 9, 2008 at << http://www.vectoranomaly.com/science.htm>>, Proceedings of the Ninth International Workshop on Artificial Intelligence and Statistics, 2003, pp. 1-8.

Tipping, "Sparse Bayesian Learning and the Relevance Vector Machine", retrieved on Jul. 9, 2008 at <<http://www.cs.colorado.edu/~mozer/courses/6622/papers/Tipping2001.pdf>>, Journal of Machine Learning Research, 2001, pp. 211-244.

Williams, et al., "Sparse Bayesian Learning for Efficient Visual Tracking", retrieved on Jul. 9, 2008 at <<http://ieeexplore.ieee.org/iel5/34/31215/01453516.pdf?tp=&isnumber=&arnumber=1453516>>, IEEE Transactions on Pattern Analysis and Machine Intelligence, vol. 27, No. 8, 2005, pp. 1292-1304.

Wipf, et al., "Perspectives on Sparse Bayesian Learning", retrieved on Jul. 9, 2008 at <<http://www.dsp.ece.rice.edu/cs/Rao7.pdf>>, MIT Press, Advances in Neural Information Processing Systems 16, vol. 52, No. 8, 2004, pp. 2153-2164.

\* cited by examiner 301  302  303

COMPUTATIONALLY EFFICIENT PROBABILISTIC LINEAR REGRESSION

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Regression is used in many applications to predict the continuous value of an output, such as the value of the stock market or the pixel intensity in an image, given a new input. Regression uses training data which is a collection of observed input and output pairs to perform the prediction. Probabilistic regression provides a degree of uncertainty in addition to the prediction of an output. The degree of uncertainty provides an indication of the confidence associated with the predicted output value and this may be very useful in decision making. For example, a different decision may be made if the regression indicates a low confidence in a value compared to a high confidence in the same value.

There are a number of known techniques for performing accurate probabilistic regression; however, all these techniques have a high computational cost of learning from data and of making predictions. This means that they are not suitable for many applications; in particular they are not suitable for applications where decisions need to be made quickly. A number of techniques have been proposed to make probabilistic regression more efficient and these are based on sparse linear models. Sparse linear models use linear combinations of a reduced number of basis functions. These sparse linear models are, however, not suitable for use in decision making because they are overconfident in their predictions, particularly in regions away from any training data.

The embodiments described below are not limited to implementations which solve any or all of the disadvantages of known techniques for performing probabilistic regression.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A computationally efficient method of performing probabilistic linear regression is described. In an embodiment, the method involves adding a white noise term to a weighted linear sum of basis functions and then normalizing the combination. This generates a linear model comprising a set of sparse, normalized basis functions and a modulated noise term. When using the linear model to perform linear regression, the modulated noise term increases the variance associated with output values which are distant from any data points.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, sparse linear models are attractive for probabilistic regression for computational reasons and because they are easily interpreted. In these models, the regression function is simply a weighted linear sum of M basis functions $\phi_1(x), \ldots, \phi_M(x)$:

$$f(x) = \sum_{m=1}^{M} w_m \phi_m(x) = w^T \phi(x) \tag{1}$$

where x is a (vectorial) input. A popular Bayesian treatment is the relevance vector machine (RVM) in which a Gaussian prior is placed on the weights: $p(w)=N(0,A)$, where A is a diagonal matrix of variance parameters $a_1, \ldots, a_M$. The observed outputs y are assumed to be corrupted by Gaussian white noise of variance $\sigma^2$ from the underlying regression function f(x). Therefore, given a data set of N input-output pairs $(x_1, y_1), \ldots, (x_N, y_N)$, it is possible to compute the Gaussian posterior distribution on the weights $p(w|y)$ and make a Gaussian prediction at a new point $x^*$: $p(y^*|x^*, y)$. In the RVM model it is customary to use localized basis functions centered on the training inputs. The model evidence $p(y|A)$ is maximized to learn the variances of the weights A. An attractive property of the RVM is that most of the weights tend to zero, effectively pruning the corresponding basis functions. The result is a sparse, and hence computationally efficient, linear model with M<<N. The combination of a finite linear model with sparsity inducing priors on the weights is known as the Sparse Bayesian learning framework.

As a Bayesian regression model, the RVM gives predictive distributions for new inputs, i.e., it supplies error bars, however, as described above, these uncertainties are often unreasonable and in particular the model is overconfident away from observed data points.

Figure 1:
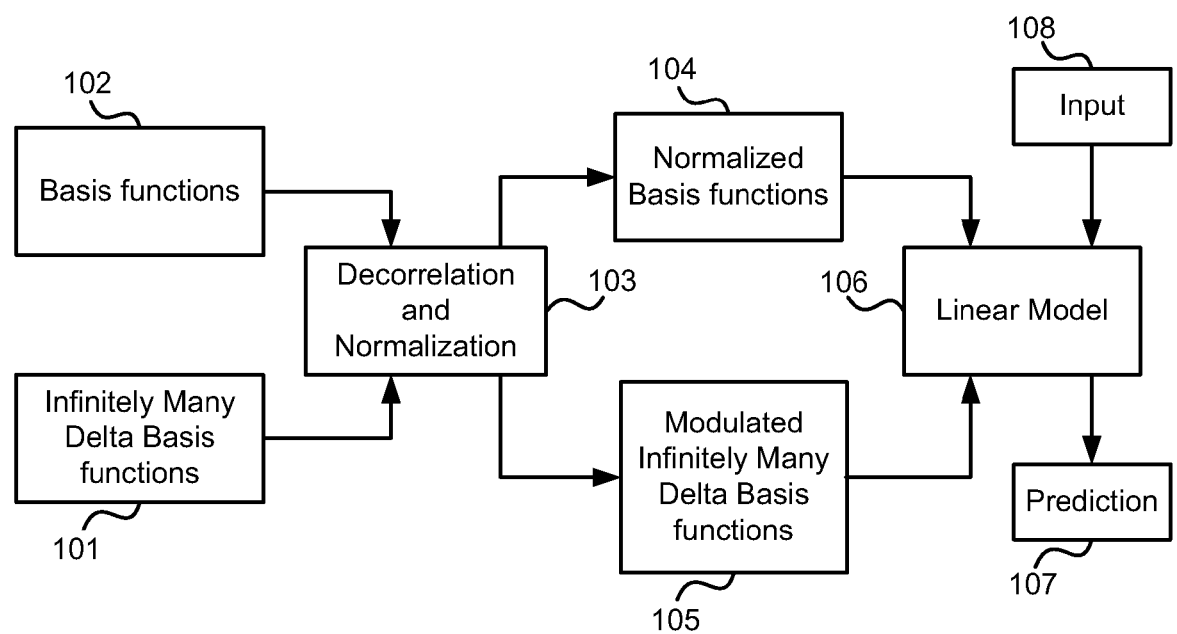
FIG. 1 is a schematic diagram of an improved method for building probabilistic sparse linear models.

FIG. 1 is a schematic diagram of an improved method for building probabilistic sparse linear models (i.e. linear combinations of a reduced set of basis functions). As shown in FIG. 1, an infinite number of totally uncorrelated basis functions 101 are added to the model (in addition to the M basis functions 102, as described above). The total a priori uncertainty is then normalized (block 103) to a desired pre-specified envelope (e.g. to a constant prior variance). The normalization takes into account the shapes of all existing basis functions 102 in the model as well as the model uncertainty about the value of the weight associated with each basis function. The output of the normalization (block 103) is the normalized basis functions 104 (as is standard) with the addition of the modulated infinitely many basis functions 105 which provide a linear model 106. The linear model 106 can be used to make predictions 107 based on inputs 108.

By adding the infinite number of uncorrelated (delta) basis functions 101 prior to the normalization step, any very long term correlations which might otherwise be introduced by the normalization step, are avoided. These long term correlations are introduced in naive normalization because whenever one basis function is dominant, it is normalized to a saturated non-zero constant value whilst all other basis functions are normalized to zero. This introduces very strong long term correlation and results in overconfidence in predictions. The method shown in FIG. 1, avoids the long term correlation and hence also avoids the overconfidence. As a result the normalization step (block 103) may be referred to as a decorrelation and normalization step.

The modulated infinitely many basis functions 105, which may also be referred to as a modulated noise term (where the infinite number of totally uncorrelated basis functions 101 are considered a white noise term), is suppressed in regions where data is available and is dominant in regions away from data points, thus leading to increased uncertainly in predictions away from data points. This is shown graphically in FIG. 2 and described below. This suppression occurs within the normalization step (block 103).

Although the description herein refers to adding an infinite number of uncorrelated basis functions, in some examples a large number of uncorrelated basis functions may be used. In such an example, the large number of basis functions are located in the regions relevant for prediction. The infinite number of basis functions (or white noise term) is, however, easier to describe mathematically and there is no requirement to specify the position and/or density of basis functions.

Figure 2:
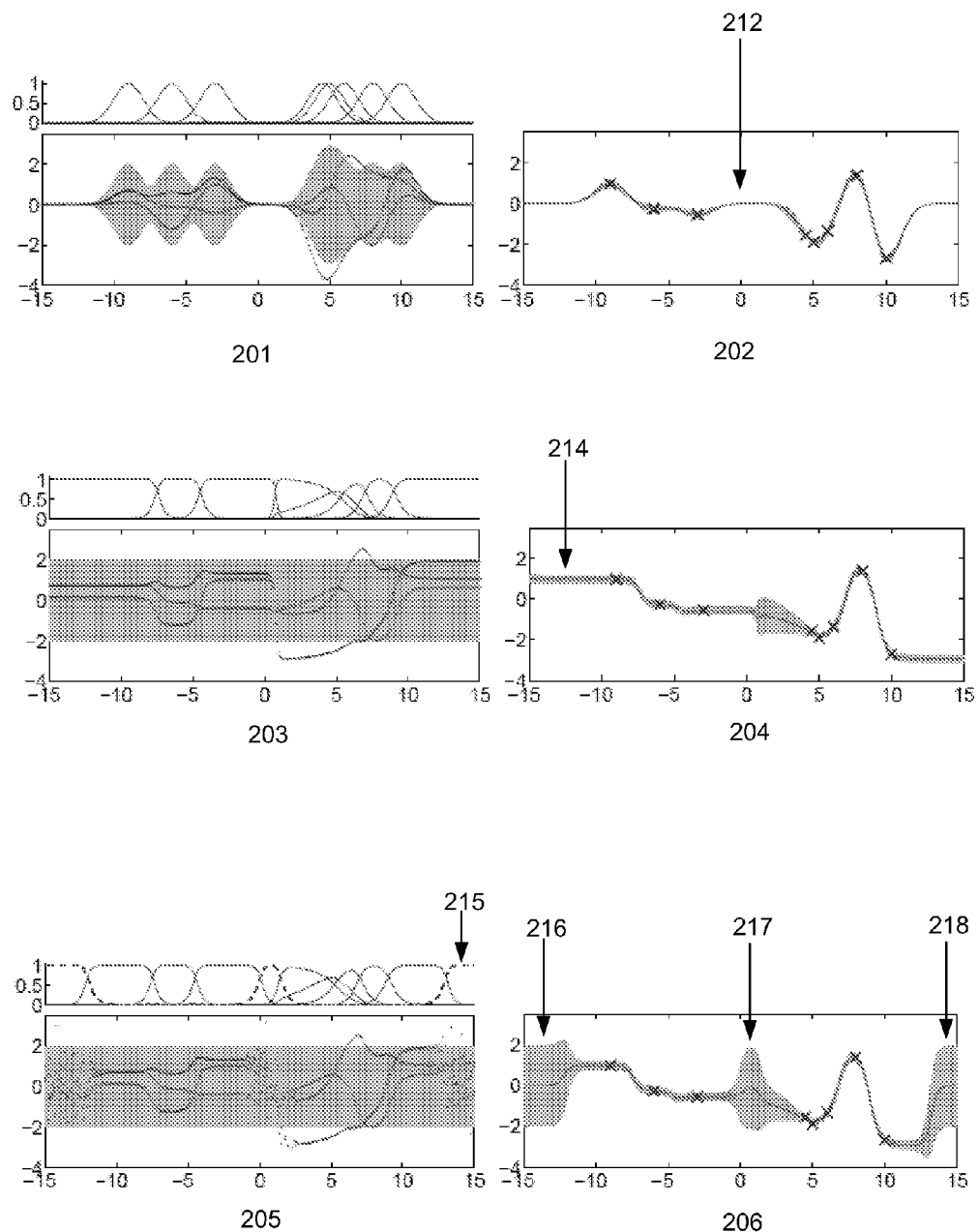
FIG. 2 shows a comparison between the performance of RVM, normalized RVM and the method shown in FIG. 1.

FIG. 2 shows a comparison between the performance of RVM (graphs 201-202), normalized RVM, which has a constant prior variance by construction (graphs 203-204) and the method shown in FIG. 1, which is referred to herein as 'decorrelation and normalization', (graphs 205-206). The graphs on the left of FIG. 2 (graphs 201, 203, 205) show samples from the prior with the basis functions, including normalization where appropriate, shown above the prior graphs. The graphs on the right (graphs 202, 204, 206) show the predictive distribution for a small training set drawn from the RVM prior, given by the crosses in the graphs. Two standard deviation prior and predictive envelopes are shaded in grey. The parameters of the models are fixed to those of the generating RVM prior and no learning is taking place.

Graph 202 in FIG. 2 shows that with RVM the predictions are extremely confident away from the data points (e.g. in region indicated by arrow 212 where the predictive envelope is very narrow). By comparison, in normalized RVM (as shown in graph 204), the uncertainty is increased away from the data points (e.g. in region indicated by arrow 214); however, the uncertainty saturates at a constant level which still results in overconfidence. Using the method shown in FIG. 1 (see graphs 205-206), the envelope of the modulated infinitely many basis functions (or noise) 105, which is shown as a dashed line 215, dominates away from data points and as a result the uncertainty increases away from data points (e.g. in regions indicated by arrows 216-218).

The decorrelation and normalization method (e.g. as shown in FIG. 1) provides a prior which decorrelates but does not decay away from the basis functions, whilst maintaining the computational sparsity. This method is described in more detail below. The large number of uncorrelated basis functions provide a large degree of freedom away from the data points which provides the high levels of uncertainty in the model.

In the decorrelation and normalization method, a white noise Gaussian process $w_0(x)$ of constant variance $a_0$ is added to the linear model before normalization, i.e. equation (1) becomes:

$$f(x) = \sum_{m=1}^{M} w_m \phi_m(x) + w_0(x) \tag{2}$$

The prior distribution on f(x) can be described as a Gaussian process (GP) with degenerate covariance function:

$$k(x, x') = \phi(x)^T A \, \phi(x') + a_0 \delta_{x,x'} \tag{3}$$

Here, degenerate refers to the fact that any covariance matrix K formed from the covariance function k(x,x') will have a maximum rank M. The prior variance envelope (e.g. as shown in graph 205 of FIG. 2) is given by the diagonal of the covariance function:

$$d(x) = \sum_{m=1}^{M} a_m \phi_m^2(x) + a_0 \tag{4}$$

The covariance function may be normalized to achieve a constant prior variance using:

$$\tilde{k}(x, x') = c \frac{k(x, x')}{\sqrt{k(x, x)k(x', x')}} = c \frac{k(x, x')}{\sqrt{d(x)d(x')}} \tag{5}$$

This provides a finite linear model with normalized basis functions plus a modulated white noise Gaussian process:

$$f(x) = \sqrt{c} \left[ \sum_{m=1}^{M} w_m \frac{\phi_m(x)}{\sqrt{d(x)}} + w_0(x) \frac{1}{\sqrt{d(x)}} \right] \tag{6}$$

The effect of this normalized white noise process can be seen in graph 205 of FIG. 2, which shows samples from the prior for a particular choice of $a_0$. The basis functions are flattened to a degree, but unlike the noiseless normalized solution (graph 203), as one moves away from the basis function centers the white noise process takes over and decorrelates the sample functions. The original constant variance white noise process is normalized to have variance $a_0=d(x)$, which means it dominates when the basis functions decay. Its envelope is shown as a dashed line 215 with the basis functions in graph 205. The relative magnitude of $a_0$ to A determines the strength of the noise process relative to the basis functions. Graph 206 shows predictions from the model, where the desired behavior of the predictive variances can now be observed and which grow as one moves away from data.

Figure 3:
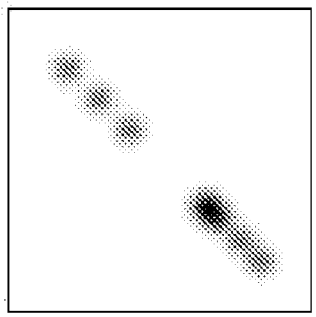
FIG. 3 shows the covariance matrices for each of RVM, normalized RVM and the method shown in FIG. 1.
Figure 3:
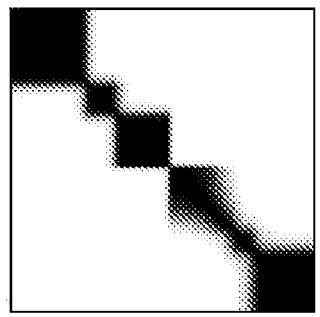
Figure 3:
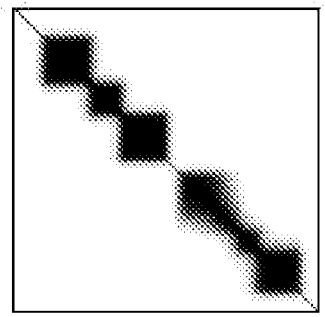

FIG. 3 shows the covariance matrices for each of RVM (graph 301), normalized RVM (graph 302) and decorrelation and normalization (graph 303), with dark areas indicating high covariance. Graph 303 illustrates the new covariance matrix, using the method described above, with constant diagonal and reduced blocks of high correlation.

By adding a weight function $w_0(x)$ to the model it might at first seem that this implies the addition of infinitely many new basis functions, and potentially an increase in computational cost. However, since $w_0(x)$ is a white noise process, no additional correlations are introduced in the model, and hence the computational cost remains the same as for the RVM. This can be seen by looking at the covariance matrix:

$$\tilde{K}=cD^{-1/2}KD^{-1/2}=c[\tilde{\Phi}_{NM}A\tilde{\Phi}_{NM}^T+a_0D^{-1}] \tag{7}$$

where $D=\mathrm{diag}[d(x_1), \ldots, d(x_N)]$ and $\tilde{\Phi}_{NM}$ are the normalized basis functions. This is no longer a low-rank covariance matrix, but rather a low-rank matrix plus a diagonal. The inversion of this matrix (plus the measurement noise $\sigma^2 I_N$) can still be performed in $NM^2$ time. Also the cost of the predictions remains the same as a finite linear model: M for the mean and $M^2$ for the variance per test case. Just like in the RVM the parameters of the model may be learned by maximizing the evidence p(y) using gradient ascent. Details of the prediction equations and evidence are given in appendix A.

Although the above examples show normalization assuming that the desired prior variance was constant, normalizing to achieve any arbitrary (and valid) prior envelope c(x) is may be used. In order to achieve this, the constant c is replaced by the function c(x) (for instance in equation (5)). For example, if the prior variance of a model linear in the inputs was desired, c(x) would be a quadratic form. In such an example, equation (6) becomes:

$$f(x) = \sqrt{c(x)}\left[\sum_{m=1}^{M} w_m \frac{\phi_m(x)}{\sqrt{d(x)}} + w_0(x)\frac{1}{\sqrt{d(x)}}\right]$$

The method described above allows an arbitrary set of basis functions to be chosen and normalized to produce sensible priors, and the set of basis functions need not necessarily be derived from any kernel function. This is unlike other techniques, such as the FITC (fully independent training conditional) approximation which requires an underlying desired GP covariance function for its construction. Additionally, the method described above uses the adjustable A variance parameters to automatically prune out unnecessary basis functions, thereby finding a very sparse solution.

The method described above also enables modeling of non-stationarity and heteroscedasticity. Heteroscedasticity is a property of a series of random variables and in the context of regression may be described as an input-dependent noise level (i.e. the variance/noise of the output variable depends on the value/location of the input variable). The white noise term added can be used to model both uncertainty and genuine noise in the system such that the resultant uncertainty in the prediction may be caused by the model uncertainty and/or the noise. This can be demonstrated by applying the method described above to Silverman's motorcycle data set (as described in 'Some aspects of the spline smoothing approach to nonparametric regression curve fitting' by B. W. Silverman and published in J. Roy. Stat. Soc. B, 47(1):1-52, 1985), which comprises accelerometer readings as a function of time in a simulated impact experiment on motorcycle crash helmets, with 133 recordings. This is a classic benchmark dataset which exhibits both heteroscedastic (variable noise levels) and non-stationary properties.

Figure 4:
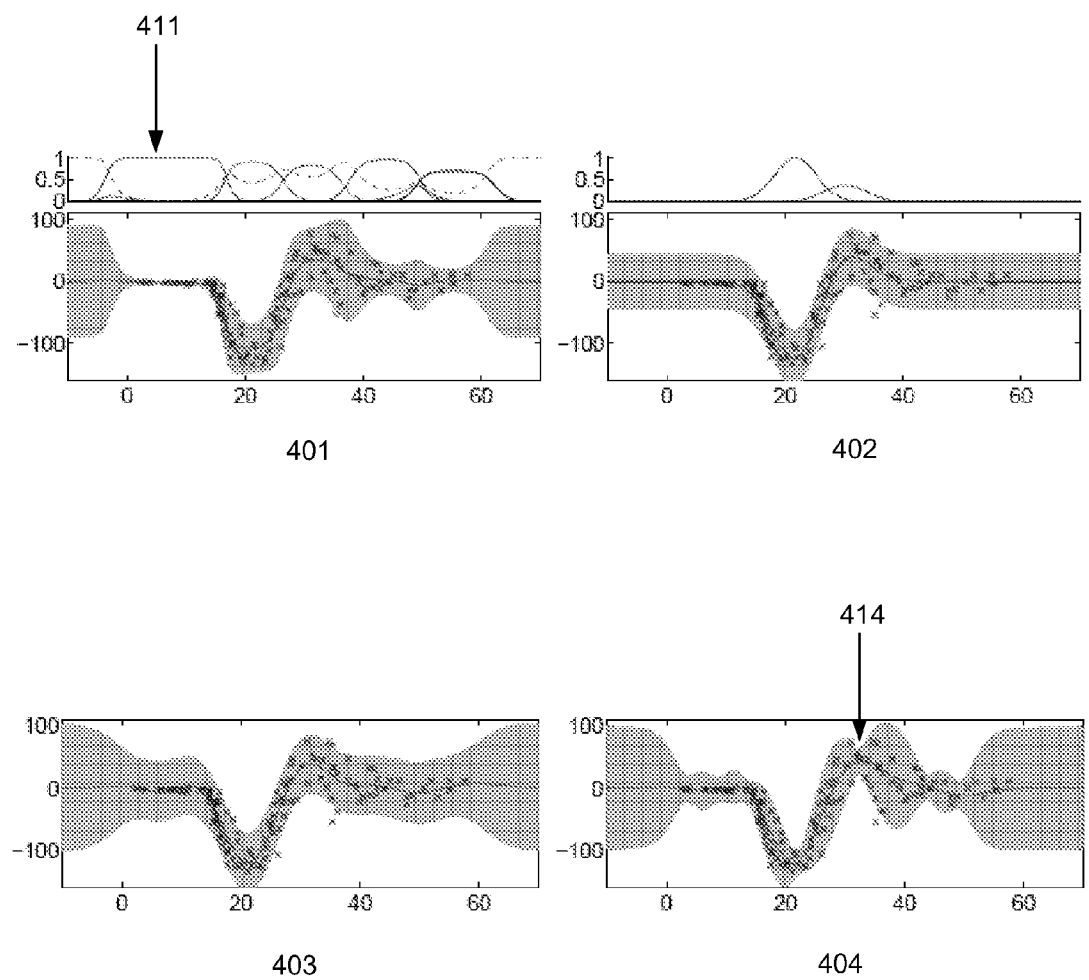
FIG. 4 shows results for each of RVM, normalized RVM and the method shown in FIG. 1 when applied to Silverman's motorcycle data set.

The results are shown in FIG. 4, with the first graph 401 showing the results for decorrelation and normalization and the other graphs 402-404 showing the corresponding results using RVM (graph 402), GP (graph 403) and FITC (graph 404). The following Gaussian basis functions were used:

$$\phi_m(x) = \exp\left(\frac{-|x-x_m|^2}{\lambda^2}\right) \tag{8}$$

and the parameters of the model (A, $a_0$, c, $\lambda$, $\sigma^2$) were learnt by maximizing the evidence with gradient ascent as described in appendix A. Initially there was a basis function centred on every data point, but as the upper section of graph 401 shows, only a handful of significant basis functions remain after training: learning A prunes almost all of them away leaving a very sparse solution. Also note that the shapes of the remaining basis functions have changed through normalization, adapting well to the non-stationary aspects of the data (for example the left-most flat section 411). The normalization process also results in modulation of the added noise process such that it not only gives uncertain predictions away from the data, but it also models very well the heteroscedastic noise in the data.

In comparison, using RVM (as shown in graph 402), the noise level is constant, and so it cannot model the heteroscedasticity, and its predictive variances do not grow away from the data (resulting in overconfidence, as described above). Full GP with Gaussian covariance (as shown in graph 403) can only learn a single gobal noise-level, and so it is not a good model for this data. Graph 404 shows the FITC sparse GP approximation, where 8 support points are used and which is learnt as described in 'Sparse Gaussian processes using pseudo-inputs' by E. Snelson and Z. Ghahramani, published in 'Advances in Neural Information Processing Systems 18' from the MIT Press. This model is of comparable sparsity to decorrelation and normalization; however it shows a tendency to overfit slightly by 'pinching in' at the support points (e.g. as indicated by arrow 414), and its underlying Gaussian stationary covariance is too smooth to model the data well.

There are many different applications for the decorrelation and normalization method described above. In particular the method may be used where a number of different methods are being used to predict a value and a decision needs to be made as to which method to rely upon. In such an example, if the uncertainty associated with a prediction using one of the methods is overconfident, the wrong method may be selected and result in an error in the ultimate prediction relied upon. Similarly, the prediction may be used to decide whether to update parameters (e.g. of a filter) on the basis of a particular prediction and an example of this is real-time probabilistic visual tracking and this is described below.

In order to perform visual tracking a displacement expert may be created by training RVM regression to predict the true location of a target object given an initial estimate of its position in an image (e.g. as described in 'Sparse bayesian learning for efficient visual tracking' by O. Williams, A. Blake, and R. Cipolla and published in IEEE Trans. on Pattern Analysis and Machine Intelligence, 27(8):1292-1304, 2005). This uses the pixel intensities sampled from an initial image region as (high dimensional) input vectors and as a consequence evaluating a basis function is expensive. By pruning many of the basis functions from the model, the RVM yields an extremely efficient tracker.

Figure 5:
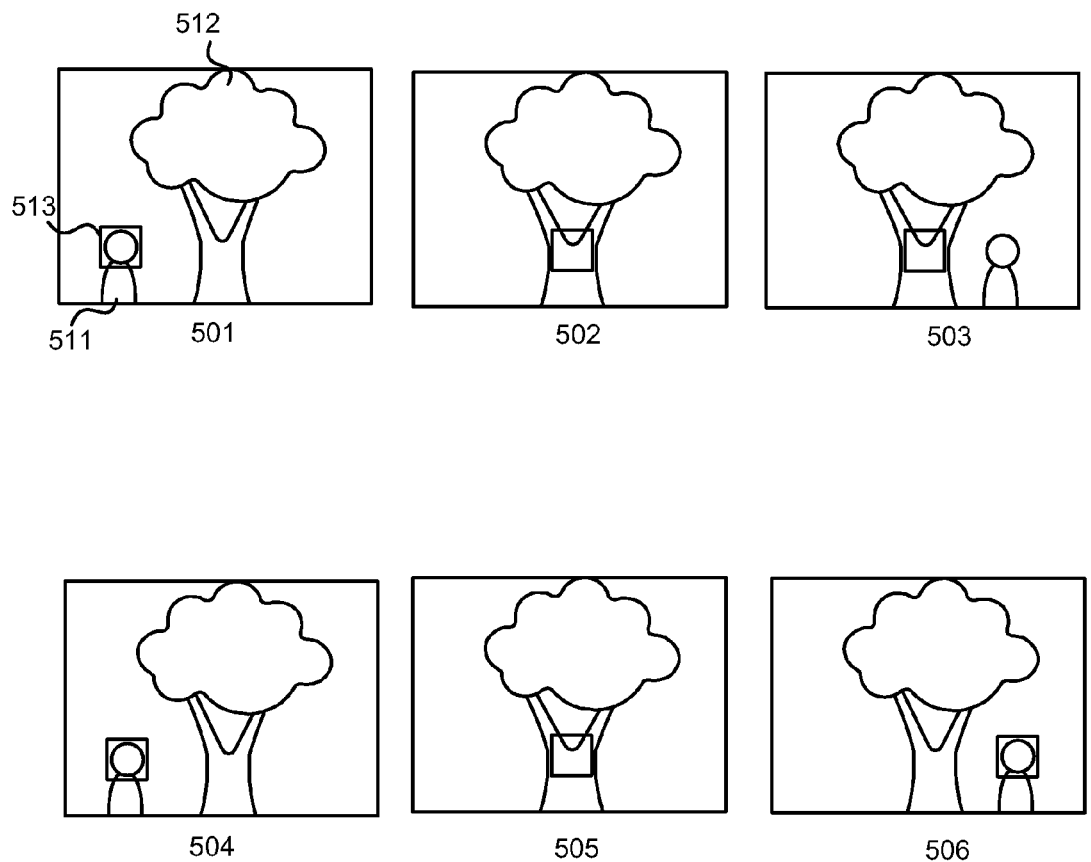
FIG. 5 shows schematic diagrams of a visual tracking method.

The Gaussian RVM displacement predictions can be fused with a dynamical motion model over time with a Kalman filter, typically yielding improved accuracy. However, when a target changes appearance significantly or becomes occluded, the small variances (i.e. small error bars) predicted by the RVM corrupt the Kalman filter estimate of the state and consequently the tracker fails. This is shown in the first three schematic diagrams 501-503 in FIG. 5, which show a person 511 walking behind a tree 512 with the tracked facial (or head) position shown by rectangle 511. The bottom row of FIG. 5 (diagrams 504-506) shows the displacement expert tracking a target (the head of person 511) through an occlusion (behind tree 512) when the decorrelated and normalized linear model described herein is used. When the tracked person 511 is occluded by a tree 512, the new model correctly makes predictions with a large variance (i.e. with large error bars) which consequently contribute very little to Kalman filter state updates, which instead relies on the (alternative) constant velocity dynamical model (which is generally less accurate). Once the occlusion is over (e.g. in schematic diagram 506), the displacement expert is again able to make confident predictions and accurate tracking resumes.

Whilst the same successful tracking performance could be achieved by using a full GP (instead of decorrelation and normalization), this would come at a significantly higher computational cost and would fail to meet real-time requirements. The difficulty with using FITC (a sparse GP approximation that produces sensible error bars) is that finding the inducing inputs requires an optimization in a space that is of very high dimension and the computational cost increases with the number of dimensions (i.e. with the number of variables in the input space). As a result FITC is also not a practical solution for such real-time applications.

Visual tracking is just one example of an application which may use the probabilistic regression method described herein. Other example applications include information retrieval, recommending friends, products etc, matching people, items etc or any other application where a query is used to perform rapid (e.g. real-time) retrieval of data. Further examples include predicting the rate of clicking of users on web search results or on web adverts and predicting the load (e.g. in terms of power, data etc) on nodes of a network. There are many online applications which perform real-time processes and where decisions may be made based on the confidence associated with a prediction or the confidence associated with a particular selection. Some of these examples are described in more detail below.

In information retrieval (IR), the methods described herein may be used to perform a selection or ranking of documents (or other information elements) which takes into consideration the confidence with which the documents were selected. For example, where a document is identified as a good match to a query with a high degree of confidence, this document may be ranked more highly than another document which is identified as a better match to the query but with a much lower degree of confidence. In another example, a set of documents which are identified as a match to a query may be screened so that documents which are selected with a confidence level which is below a defined threshold are removed from the set of documents. This information retrieval may be performed in real-time and therefore computationally efficient methods are most suitable.

In online gaming, the methods described herein may be used in matching players, particularly where a number of features or characteristics are used in matching players (e.g. user ID, demographics etc) and where the features used may be different dependent on whether a player is a new player or is an experienced player (about which the system may have actual performance metrics).

Further examples include medical image analysis, where the confidence associated with a prediction may change a course of treatment or a diagnosis which is made, and designing experiments (e.g. where the experiments themselves are expensive to run), where the model predicts the uncertainty associated with a particular output value.

By incorporating an infinite set of uncorrelated basis functions to the model in the decorrelation and normalization method described above, the prior over functions is enriched. Normalization ensures a constant prior variance (or a variance which is user-defined), and introduces decorrelations. The role of the initial localized basis functions is now to introduce local correlations, that do not overconstrain the posterior. The resultant predictive variances increase away from the observed data. The new model can still be treated as a finite linear model and retains the same propensity to sparsity as the RVM, with the corresponding computational advantage. This is due to the fact that the new basis functions do not correlate to anything, and the number of sources of correlation remains unchanged: M, the number of original basis functions. For large data sets, the computationally efficient inference schemes that have been devised for the RVM may also be used.

As described above, the treatment of finite linear models as described herein makes them suitable for fitting non-stationary and heteroscedastic data. By individually varying the ratio of the M prior variances A to the variance $a_0$ of the uncorrelated process, the model can both change the shape of the basis functions and the level of input dependent noise.

Whilst the decorrelation and normalization method is described above in comparison to RVM, the methods described above apply to any probabilistic linear model. RVM is described by way of example and provides one example of an existing method which suffers from overconfidence at positions away from data points.

Figure 6:
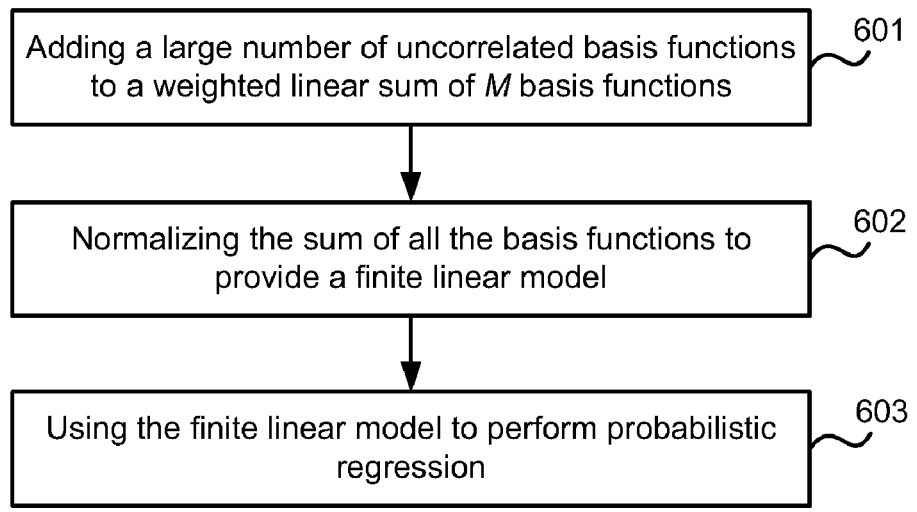
FIG. 6 shows two example methods of performing computationally efficient probabilistic linear regression.
Figure 6:
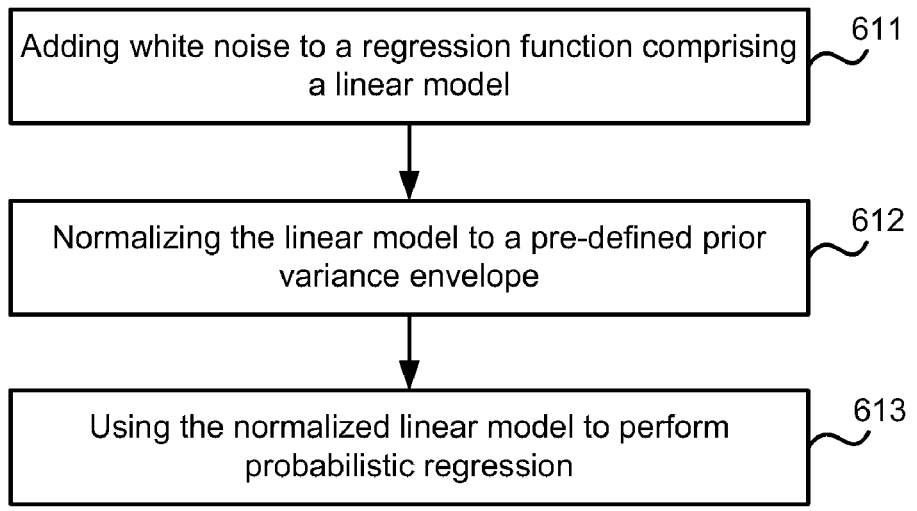

FIG. 6 shows two example methods of performing computationally efficient probabilistic linear regression, as described in detail above. In the first example method (blocks 601-603), a large number (such as an infinite number) of uncorrelated basis functions are added to a weighted linear sum (e.g. as in equation (1)) of M basis functions (block 601). The resultant sum of all the basis functions is then normalized (block 602) to provide a finite linear model and this finite linear model may be used to perform probabilistic regression (block 603). In the second example method (blocks 611-613), white noise is added to a regression function comprising a linear model (block 611, e.g. as in equation (2)) and the linear model (with the added white noise) is then normalized to a pre-defined prior variance envelope (block 612). As in the first example method, the normalized linear model may be used to perform probabilistic regression (block 613).

Figure 7:
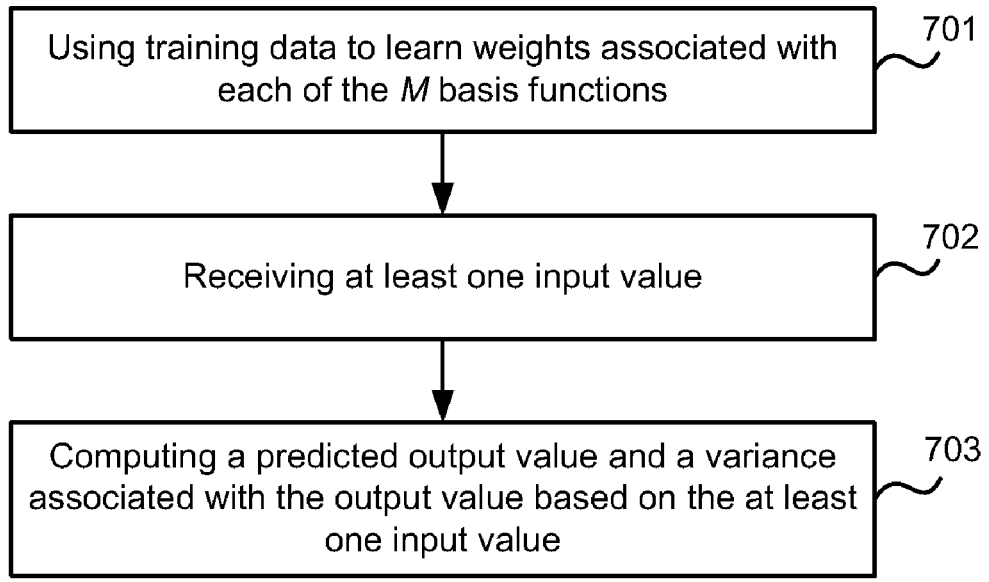
FIG. 7 shows an example of one of the method steps from FIG. 6 in more detail.

The probabilistic regression (in block 603 or 613) may be performed as shown in FIG. 7. Training data is used to learn the posterior distribution (which in the Gaussian case consists of the mean vector and the covariance matrix) of the weights associated with each of the M basis functions (block 701, e.g. as described in more detail in the Appendix) and then, on receipt of an input value (in block 702), a predicted output value and a variance associated with the output value is computed based on the input model, the weights and the linear model (block 703).

As described above, there are many different applications for the methods shown in FIGS. 6 and 7. In an example, the methods may be used in tracking a feature in a sequence of images (e.g. in a video clip), by predicting the position of the feature based on input parameters, such as the intensities of pixels in the image. The training data (used in block 701) may, for example, comprise input-output pairs of an IR query and one or more ranked documents (or other objects) or maps of pixel intensity in an image and the position of a feature in the image. The input value (received in block 702) may, for example, comprise an IR query, a map of pixel intensity in an image and the output value (predicted in block 703) may, for example, comprise one or more ranked documents or the position of a feature in the image. The variance (predicted in block 703) may comprise a confidence level, a percentage, error bars, a range etc.

Figure 8:
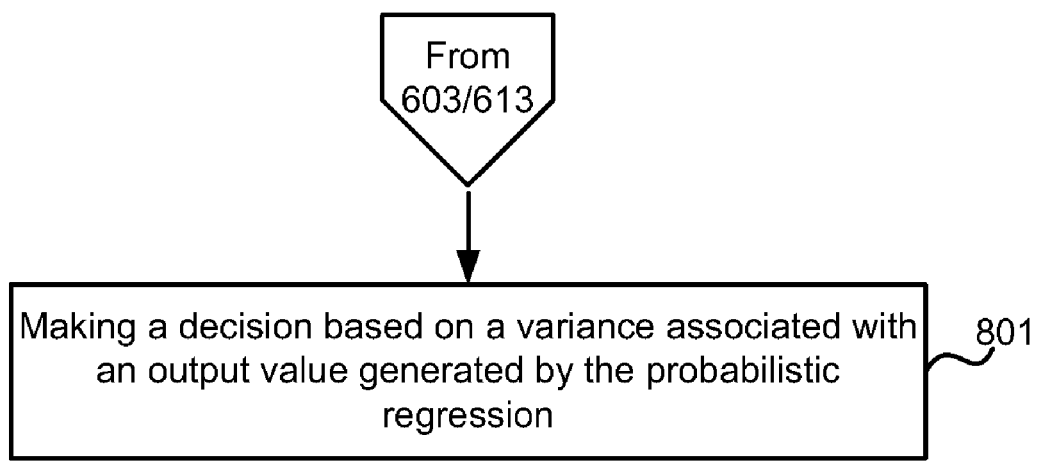
FIG. 8 shows a further method step which may follow on from the methods shown in FIG. 6.

In many examples, the output of the probabilistic regression may be used to make a decision (block 801), as shown in FIG. 8. In an example, the decision may be whether to update a filter based on the predicted value or whether to discard a piece of data. The decision is made based on the variance associated with the output value (e.g. as generated in block 703).

Figure 9:
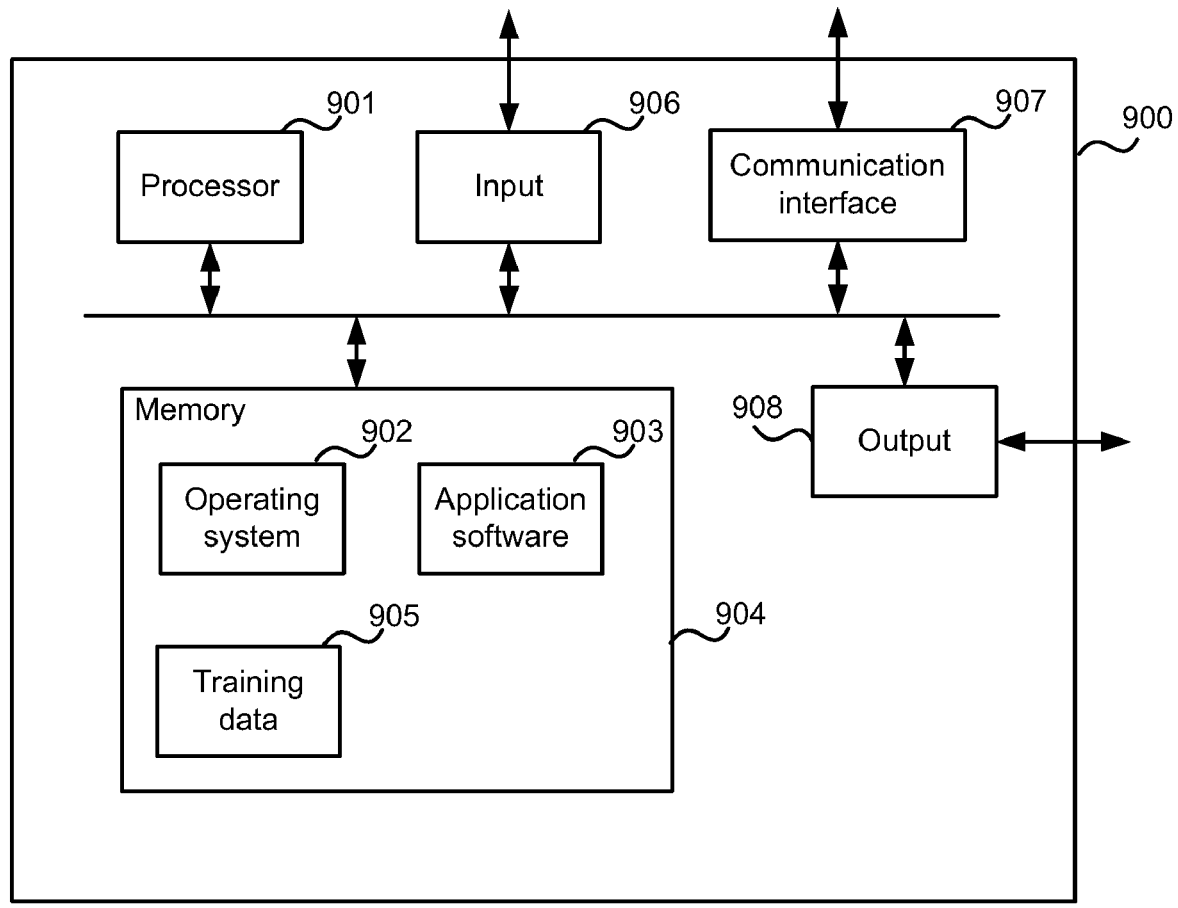
FIG. 9 illustrates an exemplary computing-based device in which embodiments of the methods described herein may be implemented.

FIG. 9 illustrates various components of an exemplary computing-based device 900 which may be implemented as any form of a computing and/or electronic device, and in which embodiments of the methods described herein may be implemented. As described above, the methods described herein may be used for online applications and in such a situation the computing-based device 900 may comprise a web server. The computing-based device 900 may be referred to as a decision making system and may be used to control another apparatus or the methods described herein may be used to control other processes running on the computing-based device.

Computing-based device 900 comprises one or more processors 901 which may be microprocessors, controllers or any other suitable type of processors for processing computing executable instructions to control the operation of the device in order to perform probabilistic regression as described above (e.g. as shown in FIGS. 6-8). Platform software comprising an operating system 902 or any other suitable platform software may be provided at the computing-based device to enable application software 903 to be executed on the device. The application software 903 may comprise software for performing the methods described herein.

The computer executable instructions may be provided using any computer-readable media, such as memory 904. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 904 may also be used to store training data 905 (e.g. as used in block 701 of FIG. 7).

The computing-based device 900 may comprise one or more inputs 906 which are of any suitable type for receiving user input, media content, Internet Protocol (IP) input and/or a communication interface 907. An input 906, the communication interface 907 or another element may be used to receive input data (e.g. in block 702 of FIG. 7) which is used in performing the probabilistic regression.

One or more outputs 908 may also be provided such as an audio and/or video output to a display system integral with or in communication with the computing-based device. The display system may provide a graphical user interface, or other user interface of any suitable type. An output 908, the communication interface 907 or other element may be used to output the predicted output value and variance associated with the output value (e.g. as generated in block 703 of FIG. 7) or alternatively, the outputs of the probabilistic regression may be used internally within the computing device 900 to drive another process (e.g. in a decision making step such as block 801).

Although the present examples are described and illustrated herein as being implemented in online applications, the system described is provided as an example and not a limitation. As those skilled in the art will appreciate, the present examples are suitable for application in a variety of different types of systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

Appendix A

All that is needed to make predictions with a finite linear model in general and with the RVM in particular, is the posterior over the M dimensional weights vector:

$$p(w|y)=N(\mu,\Sigma) \text{ with } \Sigma=(\Phi_{NM}^T B^{-1} \Phi_{NM}+A^{-1})^{-1} \text{ and } \mu=\Sigma\Phi_{NM}^T B^{-1} y \quad (9)$$

where $B=\sigma^2 I_N$ is a unit matrix of size N proportional to the variance of the measurement noise $\sigma^2$. Given a new test input $x^*$, the response of all M basis functions $\Phi^*_M$ is first evaluated, and the posterior over the weights is used to obtain the mean and the variance of the Gaussian predictive distribution:

$$E(f(x^*))=\Phi^*_M \mu \text{ and } \text{Var}(f(x^*))=\Phi^*_M \Sigma \Phi^{*T}_M \quad (10)$$

Although the normalized model described herein contains a weight process $w_0(x)$, to make predictions only the posterior over the M weights associated to the original basis functions needs to be computed. The posterior is again Gaussian, with mean and covariance very similar to those of the RVM:

$$\tilde{\Sigma}=(\tilde{\Phi}_{NM}^T \tilde{B}^{-1} \tilde{\Phi}_{NM}+c^{-1}A^{-1})^{-1} \text{ and } \tilde{\mu}=\tilde{\Sigma}\tilde{\Phi}^*_M \tilde{B}^{-1} y \quad (11)$$

but with a new definition of the diagonal noise variance matrix:

$$\tilde{B}=\sigma^2 I_N + c a_0^{D-1} \quad (12)$$

and where the normalized basis functions are used:

$$\tilde{\Phi}_{NM}=D^{-1/2}\Phi_{NM} \quad (13)$$

As described above, $D=\text{diag}(d(x_1), \ldots, d(X_N))$ with:

$$d(x) = a_0 + \sum_{m=1}^{M} a_m \phi_m^2(x) \quad (4)$$

In the model described herein, the mean and the variance of the predictive distribution are given by:

$$E(f(x_*)) = \tilde{\Phi}_{*M} \tilde{\mu} \text{ and } \text{Var}(f(x_*)) = \tilde{\Phi}_{*M} \tilde{\Sigma} \tilde{\Phi}^T_{*M} + \frac{c a_0}{d(x)} \quad (14)$$

Although the expression for the predictive mean remains unchanged (up to normalization), the predictive variance gets an additional additive term that comes from the modulated white noise process.

For the model the evidence is an N-variate Gaussian distribution with zero mean, and covariance given by:

$$\tilde{C}=\tilde{\Phi}_{NM}A\tilde{\Phi}_{NM}^T+B \quad (15)$$

Using the matrix inversion lemma, the negative log evidence can be written as:

$$L = \frac{1}{2}\Big[N\log(2\pi) + \log|cA| + \log|\tilde{B}| - \log|\tilde{\Sigma}| + y^T \tilde{B}^{-1} y - y^T \tilde{B}^{-1} \tilde{\Phi}_{NM} \tilde{\Sigma} \tilde{\Phi}_{NM}^T \tilde{B}^{-1} y\Big] \quad (16)$$

The computational cost of evaluating the evidence is $NM^2$, as is that of computing its gradients with respect to the prior variances of the weights A, the prior variance $a_0$ of the $w_0$ process, the variance of the output noise $\sigma^2$, the prior overall variance of the function c, and the lengthscale $\lambda$ of the isotropic Gaussian basis functions:

$$\phi_m(x) = \exp\left(\frac{-|x-x_m|^2}{\lambda^2}\right). \quad (8)$$

The invention claimed is:

1. A method comprising:
    adding a plurality of uncorrelated basis functions to a weighted linear sum of M basis functions thereby resulting in a sum;
    normalizing, by one or more processors, the sum to provide a normalized linear model; and
    using the normalized linear model to perform probabilistic linear regression to predict a value and an associated variance, wherein the value is one of: a position of an image feature, a relevance score, a matching score, a usage rate and a load on an entity.

2. A method according to claim 1, wherein the plurality of uncorrelated basis functions comprise a white noise term.

3. A method according to claim 1, wherein the sum of the plurality of uncorrelated basis functions and the weighted linear sum of M functions is normalized to a pre-defined prior envelope.

4. A method according to claim 1, wherein the sum of the plurality of uncorrelated basis function and the weighted linear sum of M basis functions is normalized to a constant prior variance.

5. A method according to claim 1, wherein the normalized linear model is given by:

$$f(x) = \sqrt{c}\left[\sum_{m=1}^{M} w_m \frac{\phi_m(x)}{\sqrt{d(x)}} + w_0(x)\frac{1}{\sqrt{d(x)}}\right]$$

where c is pre-defined prior variance envelope, $\phi_m$ is a basis function, $w_m$ is a weight associated with the basis function, $w_o(x)$ is a white noise Gaussian process and $d(x)$ is a diagonal of a covariance function.

6. A method according to claim 1, wherein using the normalized linear model to perform probabilistic linear regression comprises:
using training data to learn weights associated with each of the M basis functions;
receiving at least one input value; and
computing a predicted output value and a variance associated with the output value based on the at least one input value and using the normalized linear model and the weights associated with each of the M basis functions.

7. A method according to claim 6, wherein the training data comprises at least one input and output value pair.

8. A method according to claim 6, wherein the at least one input value comprises a map of pixel intensities in an image and the predicted output value comprises a predicted position of a feature in the image.

9. A method according to claim 1, further comprising:
making a decision based on a variance associated with an output value generated by the probabilistic regression.

10. One or more computer memories storing device-executable instructions for performing operations comprising:
adding a white noise term to a regression function comprising a linear model;
normalizing the linear model with the white noise term to a pre-defined prior variance envelope including a constant prior variance; and
using the normalized linear model to perform probabilistic regression to predict a value and an associated confidence factor.

11. One or more computer memories according to claim 10, wherein the normalized linear model is given by:

$$f(x) = \sqrt{c}\left[\sum_{m=1}^{M} w_m \frac{\phi_m(x)}{\sqrt{d(x)}} + w_0(x)\frac{1}{\sqrt{d(x)}}\right]$$

where c is the pre-defined prior variance envelope including the constant prior variance, $\phi_m$ is a basis function, $w_m$ is a weight associated with the basis function, $w_o(x)$ is a white noise Gaussian process and $d(x)$ is a diagonal of a covariance function.

12. One or more computer memories according to claim 11, wherein using the normalized linear model to perform probabilistic regression comprises:
using training data to learn the respective weights associated with the respective basis functions;
receiving at least one input value; and
calculating an output value corresponding to the at least one input value and a confidence factor associated with the output value using the normalized linear model.

13. One or more computer memories according to claim 10, wherein using the normalized linear model to perform probabilistic regression comprises:
using the normalized linear model to perform probabilistic regression to track a location of a feature in a sequence of images.

14. One or more computer memories according to claim 10, further comprising device-executable instructions for performing:
making a decision based on a confidence factor associated with an output of the probabilistic regression.

15. A method comprising:
adding a white noise term to a regression function comprising a linear model, the linear model comprising a sum of M weighted basis functions;
normalizing the linear model with the white noise term to a pre-defined prior variance envelope;
using training data to train the normalized linear model; and
performing, by one or more processors, probabilistic regression using the trained normalized linear model to predict a position of a feature in an image and to compute a confidence parameter associated with said position.

16. A method according to claim 15, wherein the pre-defined prior variance envelope comprises a constant prior variance.

17. A method according to claim 15, wherein the normalized linear model is given by:

$$f(x) = \sqrt{c}\left[\sum_{m=1}^{M} w_m \frac{\phi_m(x)}{\sqrt{d(x)}} + w_0(x)\frac{1}{\sqrt{d(x)}}\right]$$

where c is the pre-defined prior variance envelope, $\phi m$ is a basis function, $w_m$ is a weight associated with the basis function, $w_o(x)$ is a white noise Gaussian process and $d(x)$ is a diagonal of a covariance function.

18. A method according to claim 15, further comprising:
determining whether to update parameters associated with said feature based on the confidence parameter.

19. A method according to claim 15, further comprising:
if said confidence parameter exceeds a threshold value, updating a stored position of the feature.

* * * * *